United States Patent [19]
McNeece

[11] 3,902,642
[45] Sept. 2, 1975

[54] CAR TOP RACK

[76] Inventor: Charlie E. McNeece, 12536 Ryerson Ave., Apt. No. 6, Downey, Calif. 90242

[22] Filed: Aug. 2, 1973

[21] Appl. No.: 384,929

[52] U.S. Cl. .................... 224/42.03 R; 224/42.1 E
[51] Int. Cl.² ........................................... B60R 9/04
[58] Field of Search . 224/42.1 E, 42.03 R, 42.03 A, 224/42.03 B, 42.07

[56] References Cited
UNITED STATES PATENTS

| | | | |
|---|---|---|---|
| 2,379,994 | 7/1945 | Schwinn | 224/42.03 B |
| 2,645,393 | 7/1953 | Campbell | 224/42.03 A |
| 2,848,148 | 8/1958 | Kutz | 224/42.1 E |
| 3,260,929 | 7/1966 | Hedgepeth | 224/42.1 E |

FOREIGN PATENTS OR APPLICATIONS

| | | | |
|---|---|---|---|
| 391,325 | 4/1933 | United Kingdom | 224/42.1 E |

Primary Examiner—Robert J. Spar
Assistant Examiner—Kenneth Noland
Attorney, Agent, or Firm—Matthew P. Lynch

[57] ABSTRACT

An improved car top luggage rack adapted to extend outwardly over the rear of an automobile; the rearward portion of the rack being removably supported by the rear bumper of the automobile without affecting the driver's vision through the rear window or the opening and utilization of the trunk.

1 Claim, 4 Drawing Figures

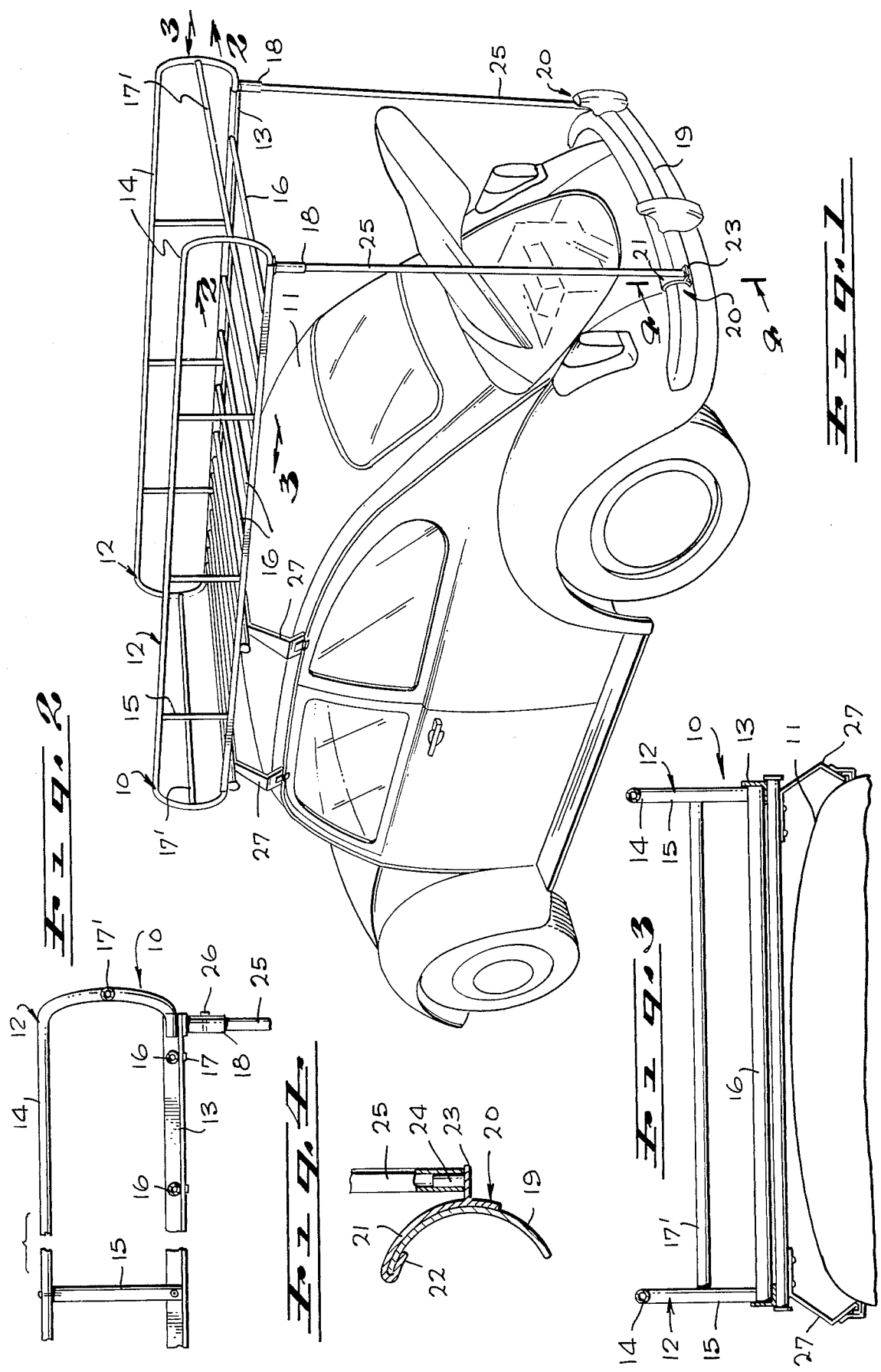

CAR TOP RACK

BACKGROUND OF THE INVENTION

Quite often on long and intermediate automobile trips it is necessary to carry a great deal of luggage and other items for the health, safety and enjoyment of the occupants of the automobile. However, as the cost of purchasing and operating an automobile increases logarithmically, people are buying smaller and smaller cars and consequently, there is less room for storage of luggage.

With a full size car, this is not too great a problem because all that needs to be done is to put a carrier on the roof of the car and support the carrier thereon by a series of brackets and suction cups. With a full-sized car the rack can be of a length and width sufficient to contain and hold sufficient luggage and support equipment for the occupants of the car; however, with a small car there has been no way to secure a full-sized carrier to the top of the car without obstructing the view of the driver or access to the engine compartment.

Additionally, all car top carriers are constructed in such a manner that when they are secured to the car it is extremely difficult to remove without a large and varied assortment of tools.

SUMMARY OF THE INVENTION

The present invention overcomes the aforementioned problems by providing a car top rack which is capable of providing full size luggage capacity to a small car without interferring with the driver's vision or access to the engine or trunk compartment.

This feat is accomplished by providing a car top rack which has a length substantially greater than the length of the roof of the automobile, wherein the rack extends outwardly beyond the rearward edge of the roof and over the rear window and engine or trunk compartment. A pair of downwardly depending support legs are removably secured to the rearward corners of the rack and are removably secured to a pair of bumper brackets on their opposite ends. By maintaining the rack in a horizontal orientation with the support legs separated by a distance equivalent to the width of the trunk lid or rear window, the driver's vision remains unobstructed and the trunk lid can be opened.

BRIEF DESCRIPTION OF THE DRAWINGS

FIG. 1 is a perspective view of the car top carrier as mounted on a small car with the trunk lid opened;

FIG. 2 is a view along 2—2 of FIG. 1;

FIG. 3 is a view along 3—3 of FIG. 1; and

FIG. 4 is an enlarged partially cut-away view of the bumper bracket and the method of supporting the lower ends of the support legs.

DESCRIPTION OF THE PREFERRED EMBODIMENT

Referring now to the drawings, wherein like reference numbers designate like or corresponding parts throughout the several views, there is shown in FIG. 1 a car top rack 10, which is mounted on the roof of an automobile 11.

The rack 10 consists of a pair of spaced guard rails 12, each of which are identical; therefore, only one will be described in detail. The guard rail 12 has a substantially "L" shaped member 13, one leg of which is disposed upwardly and the opposite leg is disposed inwardly, as best illustrated in FIG. 3. Secured to the member 13 is an elongated substantially "C"-shaped member 14, the free ends of the member 14 is secured to the opposite free ends of the member 13 to form a closed substantially elliptical guard rail 12. At least one brace 15 is secured to both the member 13 and the member 14, as illustrated in FIG. 2, to provide rigidity to the guard rail 12.

Disposed between the guard rails 12 and secured to the inwardly disposed leg of the members 13 are a plurality of cross bars 16. The cross bars 16 are secured to the members 13 by any well known method such as a nut and bolt 17, as shown in FIG. 2. The cross bars 16, while shown as being constructed from aluminum tubing, can obviously be made from any one of a number of different materials, i.e. plastic, wood and fibre. The cross bars 16 are disposed in spaced parallel relationship along the complete length of the members 13; the space between the cross bars 16 can obviously be varied to determine to optimum spacing, to provide the required support with the minimum amount of material. Secured to the guard rails 12 between their radiused ends is a cross brace 17 which provides additional rigidity to the guard rails 12 and additionally serves as a stop to prevent any luggage that may be placed upon the cross bars 16 between the guard rails 12 from sliding off the rack in either a forward or rearward direction.

Secured to the rearward end of each of the members 13 and depending downwardly therefrom is a nipple 18. The nipple 18 is secured along one end to the member 13 and represents a cylinder open on its lower end and closed along its upper end by the member 13.

Referring now to FIG. 4, there is shown an automobile rear bumper 19 and a support bracket 20 secured thereto. The bracket 20 consists of an arcuate section 21 having a lip 22 which lies in spaced complementary relationship to a portion of the section 21. The size and relationship of the section 21 and the lip 22 is determined by the size and shape of the rear bumper upon which the bracket 20 is to be mounted and the configuration shown in FIG. 4 is illustrative only and not to be considered as limiting. Secured to the outer surface of the arcuate section 21 and disposed substantially perpendicular thereto in a horizontal plane is a pedestal 23. The pedestal 23 has secured thereto a pin 24 which extends upwardly in a vertical plane perpendicular to the pedestal 23 and complementary to the nipple 18 when the bracket 20 is secured to the rear bumper of an automobile, as shown in FIG. 1.

A leg 25 is disposed between each of the nipples 18 and the pins 24 in order to support the rearward end of the rack 10 which extends outwardly over the rear window and trunk of the automobile. The leg 25 is preferably of a tubular construction, having an internal diameter sufficient to slide over and envelope the pin 24 and rest upon the pedestal 23, as best illustrated in FIG. No. 4. The opposite end of the leg 25 has an external diameter sized to slide into and be enveloped by the nipple 18 in the same manner as the pin 24 is enveloped by the leg 25. While the leg 25 just rests upon the pedestal 23, the upper end is secured to the nipple 18 in any manner well known in the art. For the sake of illustration, a bolt 26 has been shown in FIG. 2; however, a threaded connection or cotter pin could also be used.

It will be noted from the above description and the drawings that the bracket 20 can be secured to the bumper without the use of any tools or connectors and the leg 25 is also secured to the bracket without tools or connectors. This is possible because of the weight of the rack which keeps the bracket on the bumper and the leg securely in contact with the pedestal.

Because of the unique structural arrangement of the support structure for the car top rack, the legs 25 are disposed sufficiently far apart to be positioned on each side of the rear view window in such a manner to avoid obstructing the driver's view and also without interfering with the opening of the trunk lid.

The entire rack is positioned upon the roof of the automobile and held in fixed spaced relationship thereto by a number of clamps 27, which are well known in the art and therefore will not be described in detail. Suffice it to say that the clamps 27 are secured to the underside of the rack 10 and then clamped to the rain gutter which runs along the side of the roof. If it is desired to remove the rack from the automobile, all that needs to be done is that the clamps 27 are loosened and then the entire rack 10 can be removed as a complete assembly and stored. The brackets 20 are then simply slipped off the bumper. If it is desired to store the rack 10 in as small a space as possible, then the legs 25 are either unbolted or unscrewed from the nipples 18. Alternatively, the legs 25 can be secured to the rack 10 by a hinge arrangement which will allow the legs 25 to be pivoted about the hinge to a parallel complementary relationship to the rack 10. From a detailed consideration of this description, it will be apparent to those skilled in the art that this invention may be employed in a number of different ways through the use of routine skill in this field. For this reason, the present invention is not to be considered as being limited except by the appended claims defining the invention.

I claim:
1. A car top rack comprising:
   a pair of parallel spaced guard rails having a substantially elliptical shape, said guard rails consisting of a substantially L shaped member and a substantially C shaped member, said members being secured to each other along their ends, with said L shaped member being disposed beneath said C shaped member;
   a plurality of cross bars secured on opposite ends to said L shaped members in parallel spaced relationship;
   a nipple secured to said L shaped member along one end thereof and depending downwardly therefrom;
   a bracket consisting of an arcuate section having a lip disposed in spaced complementary relationship to a portion of the section and a pedestal secured to the outer surface of said arcuate section and disposed in a horizontal plane, said pedestal having a pin secured to its upper surface, said pin extending upwardly in a substantially vertical plane and in coaxial alignment to said nipple;
   a leg disposed between said nipple and said bracket, said leg being adapted to slide over and envelop said pin and abut the upper surface of said pedestal and the opposite end of said leg being adapted to slide within and be enveloped by said nipple; and
   means for securing said leg to said nipple.

* * * * *